(No Model.)

W. KROMER.
BUSH FOR BUNG HOLES.

No. 466,171. Patented Dec. 29, 1891.

Witnesses:
J. A. Rutherford
Robert Everett

Inventor:
Wilhelm Kromer
By James L. Norris.
Attorney.

UNITED STATES PATENT OFFICE.

WILHELM KROMER, OF FREIBURG, GERMANY.

BUSH FOR BUNG-HOLES.

SPECIFICATION forming part of Letters Patent No. 466,171, dated December 29, 1891.

Application filed September 24, 1891. Serial No. 406,682. (No model.)

*To all whom it may concern:*

Be it known that I, WILHELM KROMER, a subject of the Emperor of Germany, and a resident of Freiburg, Baden, in the Empire of Germany, have invented certain new and useful Improvements in Bushes for Bung-Holes of Casks and Barrels, of which the following is a specification, reference being had to the accompanying drawings.

My invention relates to bushes for bung-holes of casks and barrels.

In the operation of pitching casks or barrels hot air is blown into them by means of the so called "pitching-machine" for the purpose of liquefying the old pitch. This hot air is conducted through an iron tube inserted into the bung-hole of the cask or barrel. Owing to the intense heat the said tube often becomes red hot and imparts a great amount of its heat to the metallic bush in the bung-hole, thereby causing the same to expand and as a result of the subsequent cooling it becomes loose, so that the joint which the bush forms with the wood ceases to be tight. In many instances the heat caused in the above-mentioned manner is so great that the wood round the bush becomes charred or burned should the hot-air tube not be removed in time.

My said invention has for its object to prevent the occurrence of the above-mentioned defects. For this purpose the part of the bush which forms a tight joint with the stave is isolated as much as practicable from the part which touches or is in closest proximity to the pitching-pipe, providing between the said parts an annular chamber.

Figure 1:
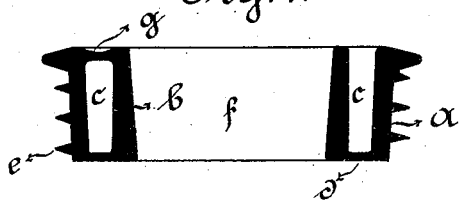
Figure 2:
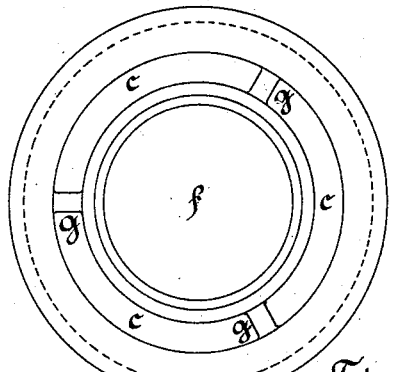
Figure 3:
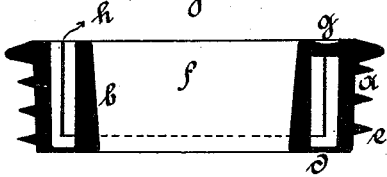
Figure 4:
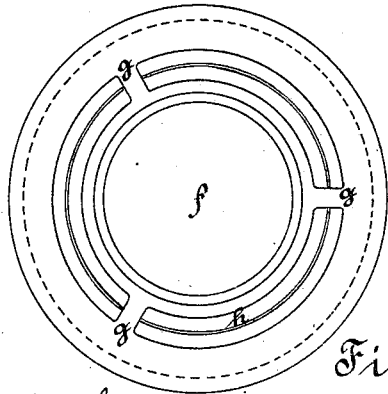

In the accompanying drawings, Figure 1 shows a vertical transverse section, and Fig. 2 a plan, of my improved bung-hole bush. Figs. 3 and 4 are a vertical section and plan showing the same bush in a modified form provided with a sheet-metal cylinder $h$.

Similar letters of reference designate corresponding parts in the drawings.

The outer wall $a$ is provided with screw-threads and screwed into the bung-hole. The inner wall $b$ forms a tight joint with the bung. These two walls are connected with each other by a very thin bottom or base $d$, and, if necessary, also by thin strengthening-ribs $g$, thereby forming the annular chamber $c$. When in this arrangement the hot pitching-tube inserted into the hole $f$ causes the wall $b$ to become heated, the air in the chamber $c$ will take up a great part of the heat from the aforesaid wall and conduct the same by a continual giving off or radiation of heat into the open air, thereby obviating an excessive heating of the said wall. As the wall $b$ gradually cools, the bottom $d$ will conduct less heat to the wall $a$ in consequence of the small transverse section which this bottom $d$ presents to the passage of the heat, while the wall $a$ in its turn gives off heat to the outer atmosphere. The wall $a$ is in this manner prevented from excessively heating the joint which it forms with the wood, thus the latter cannot become charred. In order to obviate the radiation of heat from the warmer wall $b$ to the outer wall $a$, a sheet-metal ring $h$ may be placed in the channel, Figs. 3 and 4, the said ring being attached to the ribs $g$. This cylinder, (sheet-metal ring,) however, does not extend quite to the bottom $d$, for the purpose of causing an accelerated circulation of air by the unequal heating of the same on both sides of the ring.

What I claim is—

A bung-bush consisting of inner and outer walls united at the bottom and separated from each other by a surrounding chamber $c$, substantially as and for the purposes described.

In testimony whereof I have hereunto signed my name in the presence of two subscribing witnesses.

WILHELM KROMER.

Witnesses:
 GEORGE GIFFORD,
 CHS. A. RICHTER.